(12) United States Patent
Arseneau

(10) Patent No.: US 7,966,636 B2
(45) Date of Patent: Jun. 21, 2011

(54) MULTI-VIDEO RECEIVING METHOD AND APPARATUS

(75) Inventor: Marc Arseneau, Morin Heights (CA)

(73) Assignee: Kangaroo Media, Inc., Mirabel, Quebec (CA)

( * ) Notice: Subject to any disclaimer, the term of this patent is extended or adjusted under 35 U.S.C. 154(b) by 974 days.

(21) Appl. No.: 10/478,223

(22) PCT Filed: May 22, 2002

(86) PCT No.: PCT/CA02/00757
§ 371 (c)(1),
(2), (4) Date: May 6, 2004

(87) PCT Pub. No.: WO02/096097
PCT Pub. Date: Nov. 28, 2002

(65) Prior Publication Data
US 2005/0050575 A1  Mar. 3, 2005

(30) Foreign Application Priority Data

May 22, 2001 (CA) .................................. 2348353

(51) Int. Cl.
*H04N 7/173* (2011.01)
(52) U.S. Cl. .......................................... 725/100
(58) Field of Classification Search .................... 725/100
See application file for complete search history.

(56) References Cited

U.S. PATENT DOCUMENTS

| 4,139,860 A | 2/1979 | Micic et al. |
| 4,259,690 A | 3/1981 | Nakanishi et al. |
| 4,853,764 A | 8/1989 | Sutter |
| 4,866,515 A | 9/1989 | Tagawa et al. |
| 4,887,152 A | 12/1989 | Matsuzaki et al. |
| 5,003,300 A | 3/1991 | Wells |
| 5,012,350 A | 4/1991 | Streck et al. |
| 5,023,706 A | 6/1991 | Sandberg |
| 5,045,948 A | 9/1991 | Streck et al. |
| 5,047,860 A | 9/1991 | Rogalski |
| 5,068,733 A | 11/1991 | Bennett |
| 5,138,722 A | 8/1992 | Urella et al. |

(Continued)

FOREIGN PATENT DOCUMENTS

AU       779175         9/2000

(Continued)

OTHER PUBLICATIONS

Super Bowl XXXII Game Recap, www.nfl.com/superbowl/history/recap/sbxxxii, Jan. 26, 1998.

(Continued)

*Primary Examiner* — Christopher Kelley
*Assistant Examiner* — Charles N Hicks
(74) *Attorney, Agent, or Firm* — Vierra Magen Marcus & DeNiro LLP

(57) ABSTRACT

A method and apparatus is disclosed for receiving a plurality of video signals using a single video signal transmitted using a point-to-multipoint connection; the plurality of video signals originate from various locations of an event. Information received using a reception unit comprises at least one of the plurality of video signals, at least one of the plurality of sound track signals related to the at least one of the plurality of video signals, data transmitted using the vertical blanking interval (VBI) of the single video signal and graphics.

22 Claims, 7 Drawing Sheets

U.S. PATENT DOCUMENTS

| | | | |
|---|---|---|---|
| 5,161,250 | A | 11/1992 | Ianna et al. |
| 5,189,562 | A | 2/1993 | Greene |
| 5,223,987 | A | 6/1993 | Muller |
| 5,263,156 | A | 11/1993 | Bowen et al. |
| 5,289,272 | A | 2/1994 | Rabowsky et al. |
| 5,392,158 | A | 2/1995 | Tosaki |
| 5,434,590 | A | 7/1995 | Dinwiddie, Jr. et al. |
| 5,485,504 | A | 1/1996 | Ohnsorge |
| 5,504,535 | A | 4/1996 | Abe |
| 5,508,707 | A | 4/1996 | LeBlanc et al. |
| 5,510,828 | A | 4/1996 | Lutterbach et al. |
| 5,513,384 | A | 4/1996 | Brennan et al. |
| 5,534,912 | A * | 7/1996 | Kostreski ............... 725/106 |
| 5,539,465 | A | 7/1996 | Xu et al. |
| 5,546,099 | A | 8/1996 | Quint et al. |
| 5,563,931 | A | 10/1996 | Bishop et al. |
| 5,570,412 | A | 10/1996 | LeBlanc |
| 5,574,964 | A | 11/1996 | Hamlin |
| 5,596,625 | A | 1/1997 | LeBlanc |
| 5,598,208 | A | 1/1997 | McClintock |
| 5,600,365 | A | 2/1997 | Kondo et al. |
| 5,600,368 | A | 2/1997 | Matthews, III |
| 5,602,903 | A | 2/1997 | LeBlanc et al. |
| 5,617,331 | A | 4/1997 | Wakai et al. |
| 5,621,456 | A | 4/1997 | Florin et al. |
| 5,664,880 | A | 9/1997 | Johnson et al. |
| 5,666,151 | A | 9/1997 | Kondo et al. |
| 5,696,521 | A | 12/1997 | Robinson et al. |
| 5,708,961 | A | 1/1998 | Hylton et al. |
| 5,720,037 | A | 2/1998 | Biliris et al. |
| 5,729,471 | A | 3/1998 | Jain et al. |
| 5,742,263 | A | 4/1998 | Wang et al. |
| 5,768,686 | A | 6/1998 | LeBlanc et al. |
| 5,779,566 | A | 7/1998 | Wilens |
| 5,790,121 | A | 8/1998 | Sklar et al. |
| 5,793,413 | A | 8/1998 | Hylton et al. |
| 5,797,809 | A | 8/1998 | Hyuga |
| 5,806,005 | A | 9/1998 | Hull et al. |
| 5,812,937 | A | 9/1998 | Takahisa et al. |
| 5,815,216 | A | 9/1998 | Suh |
| 5,822,527 | A | 10/1998 | Post |
| 5,847,771 | A | 12/1998 | Cloutier et al. |
| 5,894,320 | A | 4/1999 | Vancelette |
| 5,903,395 | A | 5/1999 | Rallison et al. |
| 5,907,322 | A | 5/1999 | Kelly et al. |
| 5,912,644 | A | 6/1999 | Wang |
| 5,915,020 | A | 6/1999 | Tilford et al. |
| 5,921,780 | A | 7/1999 | Myers |
| 5,945,972 | A | 8/1999 | Okumura et al. |
| 5,960,341 | A | 9/1999 | LeBlanc et al. |
| 5,987,380 | A | 11/1999 | Backman et al. |
| 5,999,808 | A | 12/1999 | LaDue |
| 6,009,336 | A | 12/1999 | Harris et al. |
| 6,020,851 | A | 2/2000 | Busack |
| 6,029,195 | A | 2/2000 | Herz |
| 6,043,777 | A | 3/2000 | Bergman et al. |
| 6,075,527 | A | 6/2000 | Ichihashi et al. |
| 6,078,594 | A | 6/2000 | Anderson et al. |
| 6,078,874 | A | 6/2000 | Piety et al. |
| 6,078,954 | A | 6/2000 | Lakey et al. |
| 6,080,063 | A | 6/2000 | Khosla |
| 6,097,441 | A | 8/2000 | Allport |
| 6,100,925 | A | 8/2000 | Rosser et al. |
| 6,124,862 | A | 9/2000 | Boyken et al. |
| 6,125,259 | A | 9/2000 | Perlman |
| 6,133,946 | A * | 10/2000 | Cavallaro et al. ............ 348/135 |
| 6,137,525 | A | 10/2000 | Lee et al. |
| 6,182,084 | B1 | 1/2001 | Cockrell et al. |
| 6,192,257 | B1 | 2/2001 | Ray |
| 6,195,090 | B1 | 2/2001 | Riggins, III |
| 6,236,365 | B1 | 5/2001 | LeBlanc et al. |
| 6,271,752 | B1 | 8/2001 | Vaios |
| 6,292,828 | B1 | 9/2001 | Williams |
| 6,301,514 | B1 | 10/2001 | Canada et al. |
| 6,332,024 | B1 | 12/2001 | Inoue et al. |
| 6,351,252 | B1 | 2/2002 | Atsumi et al. |
| 6,397,147 | B1 | 5/2002 | Whitehead |
| 6,400,264 | B1 | 6/2002 | Hsieh |
| 6,415,289 | B1 | 7/2002 | Williams et al. |
| 6,424,369 | B1 | 7/2002 | Adair et al. |
| 6,434,403 | B1 | 8/2002 | Ausems et al. |
| 6,434,530 | B1 | 8/2002 | Sloane et al. |
| 6,466,202 | B1 | 10/2002 | Suso et al. |
| 6,469,663 | B1 | 10/2002 | Whitehead et al. |
| 6,509,908 | B1 | 1/2003 | Croy et al. |
| 6,516,466 | B1 | 2/2003 | Jackson |
| 6,522,352 | B1 | 2/2003 | Strandwitz et al. |
| 6,525,762 | B1 | 2/2003 | Mileski et al. |
| 6,526,335 | B1 | 2/2003 | Treyz et al. |
| 6,526,575 | B1 | 2/2003 | McCoy et al. |
| 6,535,493 | B1 | 3/2003 | Lee et al. |
| 6,544,121 | B2 | 4/2003 | DeWeese et al. |
| 6,564,070 | B1 | 5/2003 | Nagamine et al. |
| 6,570,889 | B1 | 5/2003 | Stirling-Gallacher et al. |
| 6,571,279 | B1 | 5/2003 | Herz et al. |
| 6,578,203 | B1 | 6/2003 | Anderson, Jr. et al. |
| 6,624,846 | B1 | 9/2003 | Lassiter |
| 6,628,971 | B1 | 9/2003 | Yoon et al. |
| 6,633,232 | B2 | 10/2003 | Trajkovic et al. |
| 6,651,253 | B2 | 11/2003 | Dudkiewicz |
| 6,657,654 | B2 | 12/2003 | Narayanaswami |
| 6,669,346 | B2 | 12/2003 | Metcalf |
| 6,675,386 | B1 | 1/2004 | Hendricks et al. |
| 6,681,398 | B1 | 1/2004 | Verna |
| 6,688,973 | B2 | 2/2004 | Satloff et al. |
| 6,697,103 | B1 | 2/2004 | Fernandez et al. |
| 6,725,303 | B1 | 4/2004 | Hoguta et al. |
| 6,741,856 | B2 | 5/2004 | McKenna et al. |
| 6,760,595 | B2 | 7/2004 | Inselberg |
| 6,782,102 | B2 | 8/2004 | Blanchard et al. |
| 6,807,367 | B1 | 10/2004 | Durlach |
| 6,813,608 | B1 | 11/2004 | Baranowski |
| 6,825,875 | B1 | 11/2004 | Strub et al. |
| 6,831,907 | B2 | 12/2004 | Dolman et al. |
| 6,907,023 | B2 | 6/2005 | McKenna |
| 6,952,181 | B2 | 10/2005 | Karr et al. |
| 6,952,558 | B2 | 10/2005 | Hardacker |
| 6,961,586 | B2 | 11/2005 | Barbosa et al. |
| 6,965,937 | B2 | 11/2005 | Gaddis et al. |
| 6,973,665 | B2 | 12/2005 | Dudkiewicz |
| 6,990,681 | B2 | 1/2006 | Wang et al. |
| 6,996,413 | B2 | 2/2006 | Inselberg |
| 7,003,792 | B1 | 2/2006 | Yuen |
| 7,013,110 | B1 | 3/2006 | Carpenter |
| 7,035,804 | B2 | 4/2006 | Saindon et al. |
| 7,062,795 | B2 | 6/2006 | Skiba et al. |
| 7,069,573 | B1 | 6/2006 | Brooks et al. |
| 7,079,176 | B1 | 7/2006 | Freeman et al. |
| 7,124,425 | B1 | 10/2006 | Anderson, Jr. et al. |
| 7,132,932 | B2 | 11/2006 | Namm et al. |
| 7,133,837 | B1 | 11/2006 | Barnes, Jr. |
| 7,139,586 | B2 | 11/2006 | Kreitzer et al. |
| 7,149,549 | B1 | 12/2006 | Ortiz et al. |
| 7,155,199 | B2 | 12/2006 | Zalewski et al. |
| 7,158,079 | B2 | 1/2007 | Motoyama |
| 7,162,532 | B2 | 1/2007 | Koehler et al. |
| 7,164,930 | B2 | 1/2007 | Korneluk et al. |
| 7,194,395 | B2 | 3/2007 | Genovese |
| 7,194,687 | B2 * | 3/2007 | Sezan et al. .................. 715/719 |
| 7,209,733 | B2 | 4/2007 | Ortiz et al. |
| 7,210,160 | B2 | 4/2007 | Anderson, Jr. et al. |
| 7,248,888 | B2 | 7/2007 | Inselberg |
| 7,263,378 | B2 | 8/2007 | Inselberg |
| 7,289,793 | B2 | 10/2007 | Norwood |
| 7,292,723 | B2 | 11/2007 | Tedesco et al. |
| 7,305,691 | B2 | 12/2007 | Cristofalo |
| 7,321,655 | B2 | 1/2008 | Skakkabaek et al. |
| 7,337,462 | B2 | 2/2008 | Dudkiewicz |
| 7,343,157 | B1 | 3/2008 | Mitchell |
| 7,346,150 | B2 | 3/2008 | Frifeldt et al. |
| 7,367,043 | B2 | 4/2008 | Dudkiewicz |
| 7,376,388 | B2 | 5/2008 | Ortiz et al. |
| 7,386,870 | B2 | 6/2008 | Lu |
| 7,421,477 | B2 | 9/2008 | Pettinato |
| 7,434,247 | B2 | 10/2008 | Dudkiewicz |
| 7,444,660 | B2 | 10/2008 | Dudkiewicz |
| 7,451,401 | B2 | 11/2008 | Tanskanen et al. |

| | | | | | |
|---|---|---|---|---|---|
| 7,458,093 B2 | 11/2008 | Dukes et al. | 2004/0024812 A1 | 2/2004 | Park |
| 7,483,049 B2 | 1/2009 | Aman et al. | 2004/0032495 A1 | 2/2004 | Ortiz |
| 7,487,112 B2 | 2/2009 | Barnes, Jr. | 2004/0042103 A1 | 3/2004 | Mayer |
| 7,493,368 B2 | 2/2009 | Raverdy | 2004/0073927 A1 | 4/2004 | Knudson et al. |
| 7,496,344 B2 | 2/2009 | Stadelmann et al. | 2004/0093265 A1 | 5/2004 | Ramchandani et al. |
| 7,564,954 B2 | 7/2009 | Frifeldt et al. | 2004/0117829 A1 | 6/2004 | Karaoguz et al. |
| 7,565,153 B2 | 7/2009 | Alcock et al. | 2004/0133467 A1 | 7/2004 | Siler |
| 7,603,321 B2 | 10/2009 | Gurvey | 2004/0136547 A1 | 7/2004 | Anderson, Jr. et al. |
| 7,610,062 B2 | 10/2009 | Beeman | 2004/0137891 A1 | 7/2004 | Clark |
| 7,611,409 B2 | 11/2009 | Muir | 2004/0158638 A1 | 8/2004 | Peters et al. |
| 7,617,272 B2 | 11/2009 | Bulson | 2004/0171381 A1 | 9/2004 | Inselberg |
| 7,640,303 B2 | 12/2009 | Blumofe | 2004/0185856 A1 | 9/2004 | McKenna |
| 7,647,614 B2 | 1/2010 | Krikorian et al. | 2004/0186813 A1 | 9/2004 | Tedesco et al. |
| 7,657,920 B2 | 2/2010 | Arseneau et al. | 2004/0192329 A1 | 9/2004 | Barbosa et al. |
| 7,683,937 B1 | 3/2010 | Blumenfeld | 2004/0193371 A1 | 9/2004 | Koshiji et al. |
| 7,707,614 B2 | 4/2010 | Krikorian et al. | 2004/0193499 A1 | 9/2004 | Ortiz et al. |
| 7,761,048 B2 | 7/2010 | Bichot | 2004/0194134 A1 | 9/2004 | Gunatilake |
| 7,792,539 B2 | 9/2010 | Inselberg | 2004/0196181 A1 | 10/2004 | Huston et al. |
| 7,802,724 B1 | 9/2010 | Nohr | 2004/0203338 A1 | 10/2004 | Zilliacus |
| 2001/0010541 A1 | 8/2001 | Fernandez et al. | 2004/0203663 A1 | 10/2004 | Bowman |
| 2001/0022615 A1 | 9/2001 | Fernandez et al. | 2004/0210923 A1 | 10/2004 | Hudgeons et al. |
| 2001/0029613 A1 | 10/2001 | Fernandez et al. | 2004/0212731 A1 | 10/2004 | Sie et al. |
| 2002/0028690 A1 | 3/2002 | McKenna et al. | 2004/0220753 A1 | 11/2004 | Tabe |
| 2002/0040475 A1* | 4/2002 | Yap et al. ................... 725/39 | 2004/0229568 A1 | 11/2004 | Lowe et al. |
| 2002/0042743 A1 | 4/2002 | Ortiz et al. | 2004/0229671 A1 | 11/2004 | Stronach et al. |
| 2002/0042918 A1 | 4/2002 | Townsend | 2004/0235542 A1 | 11/2004 | Stronach et al. |
| 2002/0057340 A1 | 5/2002 | Fernandez et al. | 2004/0261127 A1 | 12/2004 | Freeman et al. |
| 2002/0057364 A1 | 5/2002 | Anderson, Jr. et al. | 2005/0021364 A1 | 1/2005 | Nakfoor |
| 2002/0058499 A1 | 5/2002 | Ortiz | 2005/0021365 A1 | 1/2005 | Nakfoor |
| 2002/0063697 A1 | 5/2002 | Amano | 2005/0021467 A1 | 1/2005 | Franzdonk |
| 2002/0063799 A1 | 5/2002 | Ortiz et al. | 2005/0028190 A1 | 2/2005 | Rodriguez et al. |
| 2002/0065074 A1 | 5/2002 | Cohn et al. | 2005/0033506 A1 | 2/2005 | Peterson |
| 2002/0069243 A1 | 6/2002 | Raverdy | 2005/0042591 A1 | 2/2005 | Bloom et al. |
| 2002/0069419 A1 | 6/2002 | Raverdy et al. | 2005/0050151 A1 | 3/2005 | Mitchell et al. |
| 2002/0073421 A1 | 6/2002 | Levitan et al. | 2005/0086079 A1 | 4/2005 | Graves |
| 2002/0077974 A1 | 6/2002 | Ortiz | 2005/0097595 A1 | 5/2005 | Lipsanen |
| 2002/0083468 A1 | 6/2002 | Dudkiewicz | 2005/0104958 A1 | 5/2005 | Egnal et al. |
| 2002/0087979 A1 | 7/2002 | Dudkiewicz | 2005/0114324 A1 | 5/2005 | Mayer |
| 2002/0087987 A1 | 7/2002 | Dudkiewicz | 2005/0120369 A1 | 6/2005 | Matz |
| 2002/0092019 A1 | 7/2002 | Marcus | 2005/0136949 A1 | 6/2005 | Barnes, Jr. |
| 2002/0095357 A1 | 7/2002 | Hunter et al. | 2005/0160465 A1 | 7/2005 | Walker |
| 2002/0108125 A1 | 8/2002 | Joao | 2005/0169253 A1 | 8/2005 | Hu |
| 2002/0124249 A1 | 9/2002 | Shintani | 2005/0172706 A1 | 8/2005 | Paulsen et al. |
| 2002/0133247 A1 | 9/2002 | Smith et al. | 2005/0188010 A1 | 8/2005 | Valk |
| 2002/0138587 A1 | 9/2002 | Koehler et al. | 2005/0201302 A1 | 9/2005 | Gaddis et al. |
| 2002/0152462 A1 | 10/2002 | Hoch et al. | 2005/0203927 A1 | 9/2005 | Sull |
| 2002/0152476 A1 | 10/2002 | Anderson, Jr. et al. | 2005/0210512 A1 | 9/2005 | Anderson, Jr. et al. |
| 2002/0161579 A1 | 10/2002 | Saindon et al. | 2005/0216299 A1 | 9/2005 | Anderson et al. |
| 2002/0166119 A1 | 11/2002 | Cristofalo | 2005/0243755 A1 | 11/2005 | Stephens |
| 2002/0167442 A1 | 11/2002 | Taylor | 2005/0251827 A1 | 11/2005 | Ellis et al. |
| 2002/0174430 A1 | 11/2002 | Ellis et al. | 2005/0251835 A1 | 11/2005 | Scott et al. |
| 2002/0184641 A1 | 12/2002 | Johnson et al. | 2005/0273830 A1 | 12/2005 | Silver et al. |
| 2002/0188943 A1 | 12/2002 | Freeman et al. | 2005/0273911 A1 | 12/2005 | Skiba et al. |
| 2002/0194589 A1 | 12/2002 | Cristofalo et al. | 2005/0275626 A1 | 12/2005 | Mueller et al. |
| 2002/0194601 A1 | 12/2002 | Perkes et al. | 2005/0280705 A1 | 12/2005 | Anderson et al. |
| 2002/0199198 A1 | 12/2002 | Stonedahl | 2005/0289597 A1 | 12/2005 | Kawahara |
| 2003/0005455 A1 | 1/2003 | Bowers | 2006/0004643 A1 | 1/2006 | Stadelmann et al. |
| 2003/0007464 A1 | 1/2003 | Balani | 2006/0015904 A1 | 1/2006 | Marcus |
| 2003/0014412 A1 | 1/2003 | Collart | 2006/0025158 A1 | 2/2006 | Leblanc et al. |
| 2003/0017826 A1 | 1/2003 | Fishman et al. | 2006/0038818 A1 | 2/2006 | Steele |
| 2003/0043769 A1 | 3/2003 | Dolman et al. | 2006/0064716 A1 | 3/2006 | Sull et al. |
| 2003/0051253 A1 | 3/2003 | Barone | 2006/0069749 A1 | 3/2006 | Herz et al. |
| 2003/0065805 A1 | 4/2003 | Barnes, Jr. | 2006/0094409 A1 | 5/2006 | Inselberg |
| 2003/0069762 A1 | 4/2003 | Gathman | 2006/0095471 A1 | 5/2006 | Krikorian et al. |
| 2003/0069829 A1 | 4/2003 | Gathman et al. | 2006/0095472 A1 | 5/2006 | Krikorian et al. |
| 2003/0070182 A1 | 4/2003 | Pierre et al. | 2006/0104600 A1 | 5/2006 | Abrams |
| 2003/0088873 A1 | 5/2003 | McCoy et al. | 2006/0107295 A1 | 5/2006 | Margis et al. |
| 2003/0093794 A1 | 5/2003 | Thomas et al. | 2006/0117365 A1* | 6/2006 | Ueda et al. ................... 725/112 |
| 2003/0100326 A1 | 5/2003 | Grube et al. | 2006/0117371 A1* | 6/2006 | Margulis ................... 725/131 |
| 2003/0105558 A1 | 6/2003 | Steele | 2006/0123053 A1 | 6/2006 | Scannell |
| 2003/0110503 A1 | 6/2003 | Perkes | 2006/0126544 A1 | 6/2006 | Markel |
| 2003/0112354 A1 | 6/2003 | Ortiz et al. | 2006/0126556 A1 | 6/2006 | Jiang |
| 2003/0189589 A1 | 10/2003 | LeBlanc et al. | 2006/0149633 A1 | 7/2006 | Voisin et al. |
| 2003/0189668 A1 | 10/2003 | Newnam et al. | 2006/0154657 A1 | 7/2006 | Inselberg |
| 2003/0220091 A1 | 11/2003 | Farrand et al. | 2006/0156219 A1 | 7/2006 | Haot |
| 2003/0220835 A1 | 11/2003 | Barnes, Jr. | 2006/0173701 A1 | 8/2006 | Gurvey |
| 2003/0222819 A1 | 12/2003 | Karr et al. | 2006/0174288 A1 | 8/2006 | Bichot |
| 2004/0003398 A1 | 1/2004 | Donian et al. | 2006/0174297 A1 | 8/2006 | Anderson, Jr. et al. |
| 2004/0006774 A1 | 1/2004 | Anderson, Jr. et al. | 2006/0179462 A1 | 8/2006 | Willame et al. |

| | | |
|---|---|---|
| 2006/0184431 A1 | 8/2006 | Rosenberg |
| 2006/0184538 A1 | 8/2006 | Randall |
| 2006/0190250 A1 | 8/2006 | Saindon et al. |
| 2006/0200842 A1 | 9/2006 | Chapman et al. |
| 2006/0212585 A1 | 9/2006 | Eaton et al. |
| 2006/0223528 A1 | 10/2006 | Smith |
| 2006/0242680 A1 | 10/2006 | Johnson et al. |
| 2006/0244839 A1* | 11/2006 | Glatron et al. ............ 348/211.11 |
| 2006/0252526 A1 | 11/2006 | Walker et al. |
| 2006/0253330 A1 | 11/2006 | Maggio et al. |
| 2006/0253542 A1 | 11/2006 | McCausland et al. |
| 2006/0259924 A1 | 11/2006 | Boortz |
| 2006/0268363 A1 | 11/2006 | Meinders |
| 2006/0268828 A1 | 11/2006 | Yarlagadda |
| 2006/0276174 A1 | 12/2006 | Katz et al. |
| 2006/0277308 A1 | 12/2006 | Morse |
| 2006/0282319 A1 | 12/2006 | Maggio |
| 2006/0288375 A1 | 12/2006 | Ortiz et al. |
| 2007/0014536 A1 | 1/2007 | Hellman |
| 2007/0015586 A1 | 1/2007 | Huston |
| 2007/0018880 A1 | 1/2007 | Huston |
| 2007/0018952 A1 | 1/2007 | Arseneau et al. |
| 2007/0019068 A1 | 1/2007 | Arseneau et al. |
| 2007/0019069 A1 | 1/2007 | Arseneau et al. |
| 2007/0021055 A1 | 1/2007 | Arseneau et al. |
| 2007/0021056 A1 | 1/2007 | Arseneau et al. |
| 2007/0021057 A1 | 1/2007 | Arseneau et al. |
| 2007/0021058 A1 | 1/2007 | Arseneau et al. |
| 2007/0022289 A1 | 1/2007 | Alt |
| 2007/0022438 A1 | 1/2007 | Arseneau et al. |
| 2007/0022445 A1 | 1/2007 | Arseneau et al. |
| 2007/0022446 A1 | 1/2007 | Arseneau et al. |
| 2007/0022447 A1 | 1/2007 | Arseneau et al. |
| 2007/0050191 A1 | 3/2007 | Weider et al. |
| 2007/0058041 A1 | 3/2007 | Arseneau et al. |
| 2007/0061266 A1 | 3/2007 | Moore et al. |
| 2007/0061487 A1 | 3/2007 | Moore et al. |
| 2007/0061845 A1 | 3/2007 | Barnes, Jr. |
| 2007/0094698 A1 | 4/2007 | Bountour et al. |
| 2007/0095887 A1 | 5/2007 | Barbosa et al. |
| 2007/0117576 A1 | 5/2007 | Huston |
| 2007/0118426 A1 | 5/2007 | Barnes, Jr. |
| 2007/0121534 A1 | 5/2007 | James et al. |
| 2007/0156443 A1 | 7/2007 | Gurvey |
| 2007/0173266 A1 | 7/2007 | Barnes, Jr. |
| 2007/0180062 A1 | 8/2007 | Southerland et al. |
| 2007/0197247 A1 | 8/2007 | Inselberg |
| 2007/0202900 A1 | 8/2007 | Inselberg |
| 2007/0233585 A1 | 10/2007 | Ben Simon et al. |
| 2007/0279494 A1 | 12/2007 | Aman et al. |
| 2007/0286596 A1 | 12/2007 | Lonn |
| 2008/0016534 A1* | 1/2008 | Ortiz et al. ....................... 725/62 |
| 2008/0036653 A1 | 2/2008 | Huston |
| 2008/0065735 A1 | 3/2008 | Szeto et al. |
| 2008/0065768 A1 | 3/2008 | Ortiz et al. |
| 2008/0065997 A1 | 3/2008 | Szeto et al. |
| 2008/0133421 A1 | 6/2008 | Myers et al. |
| 2008/0191009 A1 | 8/2008 | Gressel et al. |
| 2008/0192116 A1 | 8/2008 | Tamir et al. |
| 2008/0198230 A1 | 8/2008 | Huston |
| 2008/0200161 A1 | 8/2008 | Morse |
| 2008/0259096 A1 | 10/2008 | Huston |
| 2008/0270579 A1 | 10/2008 | Herz et al. |
| 2008/0281903 A1 | 11/2008 | Kwiatkowski |
| 2008/0288355 A1 | 11/2008 | Rosen |
| 2008/0294434 A1 | 11/2008 | Pettinato |
| 2009/0009605 A1 | 1/2009 | Ortiz |
| 2009/0018903 A1 | 1/2009 | Iyer |
| 2009/0029780 A1 | 1/2009 | Amaitis |
| 2009/0046152 A1 | 2/2009 | Aman |
| 2009/0069040 A1 | 3/2009 | Wiesmuller et al. |
| 2009/0083448 A1 | 3/2009 | Craine et al. |
| 2009/0144624 A1 | 6/2009 | Barnes, Jr. |
| 2009/0191962 A1 | 7/2009 | Hardy et al. |
| 2009/0256817 A1 | 10/2009 | Perlin et al. |
| 2009/0281392 A1 | 11/2009 | Brown |
| 2010/0023865 A1 | 1/2010 | Fulker |
| 2010/0100915 A1 | 4/2010 | Krikorian et al. |
| 2010/0150525 A1 | 6/2010 | Walker |
| 2010/0274614 A1 | 10/2010 | Fraley |

FOREIGN PATENT DOCUMENTS

| | | |
|---|---|---|
| CA | 2237939 | 8/1998 |
| CA | 2369832 | 9/2000 |
| CA | 2 361 659 A1 | 5/2003 |
| EP | 0 578 201 | 1/1994 |
| EP | 0 578 201 A2 | 1/1994 |
| EP | 1166596 A1 | 1/2002 |
| GB | 2 355 135 A | 4/2001 |
| WO | WO 93/03571 A1 | 2/1993 |
| WO | WO 94/11855 A1 | 5/1994 |
| WO | WO97/08896 | 3/1997 |
| WO | WO 97/08896 A1 | 3/1997 |
| WO | WO98/41020 | 5/1997 |
| WO | WO 98/31148 A1 | 7/1998 |
| WO | WO 98/41020 A1 | 9/1998 |
| WO | 9939299 | 8/1999 |
| WO | WO 00/54554 A1 | 9/2000 |
| WO | WO01/08417 | 2/2001 |
| WO | WO 01/08417 A1 | 2/2001 |
| WO | 0120572 A1 | 3/2001 |
| WO | WO 02/096097 A1 | 11/2002 |
| WO | WO 02/096104 A2 | 11/2002 |
| WO | WO 03/042939 A2 | 5/2003 |
| WO | WO 2004/034617 A1 | 4/2004 |
| WO | WO 2005/011254 A2 | 2/2005 |
| WO | WO 2005/076625 A1 | 8/2005 |
| WO | 2006067545 A1 | 6/2006 |
| WO | WO 2006/085844 A1 | 8/2006 |
| WO | WO 2007/009225 A1 | 1/2007 |
| WO | PCT/CA2006/001969 | 3/2007 |

OTHER PUBLICATIONS

Super Bowl XXXIII, Wikipedia, http://en.wikipedia.org/wiki/Super_Bowl_XXXIII, 1999.
Breier, Computer age comes to ballpark, North County Times, San Diego, Aug. 19, 1997.
Carter, Web Technology: It's in THE Game, www.microsoft.com/sitebuilder/features/superbowl.asp, Dec. 15, 1997.
ChoiceSeat™ Fact Sheet, Project: Super Bowl XXXII, Jan. 25, 1998.
ChoiceSeat™ Screen Shot, Superbowl XXXII, Jan. 25, 1998.
ChoiceSeat™ Advertisement, Pre-Super Bowl XXXII, Jan. 1998.
Fikes, For lucky 600 fans, there'll be TV sets at the seats, Super Bowl XXXII—It's just business, North County Times, San Diego, Jan. 14, 1998.
Stewart, Williams Interactive Video Gives Football Fans Choice, Tulsa World, Jan. 1998.
ChoiceSeat™ Hand Out at Super Bowl XXXII, Jan. 25, 1998.
Just Call It Wired Bowl, Newsweek, Cyberscope, Jan. 28, 1998.
VYVX, Doctor Design, and Erbes Dev. Group Go to the Ball Game: Watch PC-TV, Internet TV at the Stadium, http://ruel.net/top/box.article.05.htm, Sep. 1, 1997.
Williams ChoiceSeat interactive network launches inaugural season with Tampa Bay Devil Rays; expands features for second season with San Diego Padres, www.williams.com/newsroom/news_releases/1998/rel175.htm, St. Petersburg and San Diego, Mar. 30, 1998.
ChoiceSeat Draft Requirements, Dec. 1998.
Super Bowl Turns Techno Bowl, The Herald, Jan. 24, 1999.
Williams Communications' ChoiceSeat™ demonstrates the interactive evolution of sports at Super Bowl™ XXXIII, www.williams.com/newsroom/news_releases/1999/rel287.htm, Tulsa, Jan. 20, 1999.
ChoiceSeat™ Advertisement, Pre-Super Bowl XXXIII, Jan. 1999.
ChoiceSeat™ Fact Sheet, Super Bowl XXXIII™, Pro Player Stadium, Miami, Florida, Jan. 31, 1999.
Super Bowl XXXIII Game Recap, www.nfl.com/superbowl/history/recap/sbxxxiii, Feb. 1, 1999.
CSI, Inc. (ChoiceSeat™) Business Plan, Aug. 1999.
ChoiceSeat™ User Guide, New York Knicks, Madison Square Garden, Aug. 1999.
ChoiceSeat™ User Guide, New York Rangers, Madison Square Garden, Aug. 1999.

ChoiceSeat™ Flowchart, New York Rangers, Madison Square Garden, Rev. 3.2, Nov. 16, 1999.
In-Seat Interactive Advertising Device Debuts, www.williams.com/newsroom/news_releases/1999/rel426.htm, New York, Nov. 19, 1999.
Intel and ChoiceSeat™ collaborate to advance interactive sports technology, www.williams.com/newsroom/news_releases/1999/rel429.htm, Santa Clara, Calif. and New York, Nov. 29, 1999.
Gordon, Interactive Broadband Video at the Garden, Digital Video Magazine, Apr. 2000.
Sweet, With Wired Seats, Fans Get Replays, Rules, Snacks, Wall Street Journal, May 21, 2000.
CSI Incorporated ("ChoiceSeat")—Executive Summary-Short Term Tactical Plan, May 2001.
Memorandum re Obviousness to Michele Connor and Craig Tyler, from Jean Theberge and Alain Charette, Nov. 2, 2007.
History of Wireless, Johns Hopkins School of Public Health, http://www.jhsph.edu/wireless/story.html, Nov. 12, 2007.
Wireless LAN, Wikipedia, Nov. 2007.
Carroll, Fans take to ChoiceSeats: Interactive technology, e-commerce expand to sporting events, Telephonyonline, Jan. 10, 2000.
Vela Research LP to Supply Encoding for ChoiceSeat at SuperBowl XXXII, St. Petersburg, FL, Jan. 13, 1998.
Stadium fans touch the future—Internet Explorer and touch screens add interactivity to Super Bowl XXXII, 1998.
San Diego Metropolitan Magazine, Jan. 29, 1998.
Grover, Armchair Baseball from the Web—or Your Stadium Seat, Business Week, Oct. 22, 1998.
Reality Check Studios Goes Broadband with Production for Choiceseat at Madison Square Garden, Hollywood, Calif., Dec. 1, 1999.
ChoiceSeat—Event Operations Manual for Madison Square Garden, 1999 Intel Corporation, Dec. 15, 1999.
ChoiceSeat screens, Jan. 1999.
ChoiceSeat—System Administrator's Binder for Madison Square Garden, Dec. 17, 1999.
ChoiceSeat™ Fact Sheet, Jun. 13, 2007.
ChoiceSeat Operations Manual: v.1.1, 1999.
ChoiceSeat Specification, Version 2.2, Williams Communications Group, Oct. 10, 1997.
Qualcomm Stadium, Choiceseat Network Diagram, May 11, 1998.
Proposed ChoiceSeat Client Specification Summary, Initial Draft Mar. 29, 1997, Updated Sep. 30, 1997.
Schedule of Personal Property, Patents, Software and Trademarks etc. Draft, CSI Incorporated, Aug. 28, 2001.
CSI Incorporated Draft—Schedule A-IP Intellectual Property, Aug. 28, 2001.
ChoiceSeat—The Premiere Provider of Interactive Event Entertainment, PowerPoint presentation, Jan. 2000.
ChoiceSeat Intellectual Property List, Aug. 28, 2001.
Proposed ChoiceSeat Network Specification Summary, Initial Draft, Aug. 25, 1997.
Proposed ChoiceSeat Network Specification Summary, Initial Draft Aug. 25, 1997; Updated Draft Aug. 28, 1997; Updated Draft Sep. 30, 1997.
Office Action dated Jan. 21, 2009, U.S. Appl. No. 11/459,224, filed Jul. 21, 2006.
Response to Office Action dated Feb. 19, 2009, U.S. Appl. No. 11/459,224, filed Jul. 21, 2006.
Office Action dated Jun. 9, 2009 in U.S. Appl. No. 11/459,224.
Response to Office Action filed Jun. 7, 2010 in U.S Appl. No. 11/459,224.
Office Action dated Apr. 1, 2010 in U.S. Appl. No. 11/459,259.
Office Action dated Mar. 2, 2010 in U.S. Appl. No. 11/459,285.
Office Action dated Apr. 1, 2009 in U.S. Appl. No. 11/459,296.
Response to Office Action filed Oct. 1, 2009 in U.S. Appl. No. 11/459,296.
Office Action dated Dec. 24, 2009 in U.S. Appl. No. 11/459,296.
Office Action dated Sep. 18, 2008 in U.S. Appl. No. 11/459,308.
Response to Office Action filed Dec. 18, 2008 in U.S. Appl. No. 11/459,308.
Office Action dated Apr. 3, 2009 in U.S. Appl. No. 11/459,308.
Response to Office Action filed Sep. 3, 2009 in U.S. Appl. No. 11/459,308.
Notice of Allowance and Fee(s) Due dated Dec. 1, 2009 in U.S. Appl. No. 11/459,308.
Chinese Office Action dated Sep. 4, 2009 in Chinese Patent Application No. 200680034090.X.
Chinese Office Action dated Dec. 11, 2009 in Chinese Patent Application No. 2008100959713.
Response to Chinese Office Action filed Jan. 19, 2010 in Chinese Patent Application No. 200680034090.X.
English Translation of Amended Claims filed Jan. 19, 2010 in Response to Chinese Office Action in Chinese Patent Application No. 200680034090.X.
Claims Amendments filed Dec. 10, 2009 in Response to Notice of Non-Compliant Amendment in U.S. Appl. No. 11/459,275.
Office Action dated Mar. 30, 2010 in U.S. Appl. No. 11/459,275.
McGraw et al., "Security Enhancements in JDK 1.1", Securing Java, Beyond the Sandbox: Signed Code and Java 2, Section 2, Jan. 1999, John Wiley & Sons, Inc.
Response to Office Action filed Sep. 25, 2009 in U.S. Appl. No. 11/459,224.
Office Action dated Jan. 7, 2010 in U.S. Appl. No. 11/459,224.
Office Action dated Mar. 4, 2009 in U.S. Appl. No. 11/459,237.
Response to Office Action filed Sep. 2, 2009 in U.S. Appl. No. 11/459,237.
Office Action dated Nov. 23, 2009 in U.S. Appl. No. 11/459,237.
Office Action dated Jun. 25, 2009 in U.S. Appl. No. 11/459,247.
Response to Office Action filed Sep. 22, 2009 in U.S. Appl. No. 11/459,247.
Office Action dated Dec. 24, 2009 in U.S. Appl. No. 11/459,247.
Office Action dated Sep. 4, 2008 in U.S. Appl. No. 11/459,266.
Response to Office Action filed Dec. 3, 2008 in U.S. Appl. No. 11/459,266.
Office Action dated Mar. 3, 2009 in U.S. Appl. No. 11/459,266.
Response to Office Action filed Sep. 1, 2009 in U.S. Appl. No. 11/459,266.
Office Action dated Sep. 30, 2009 in U.S. Appl. No. 11/459,266.
Response to Office Action filed Dec. 14, 2009 in U.S. Appl. No. 11/459,266.
Office Action dated Mar. 3, 2010 in U.S. Appl. No. 11/459,266.
Restriction dated Mar. 4, 2009 in U.S. Appl. No. 11/459,275.
Response to Restriction filed Mar. 26, 2009 in U.S. Appl. No. 11/459,275.
Office Action dated Apr. 27, 2009 in U.S. Appl. No. 11/459,275.
Response to Office Action filed Sep. 24, 2009 in U.S. Appl. No. 11/459,275.
Office Action dated Mar. 6, 2009 in U.S. Appl. No. 11/459,278.
Response to Office Action filed Sep. 2, 2009 in U.S. Appl. No. 11/459,278.
Office Action dated Nov. 23, 2009 in U.S. Appl. No. 11/459,278.
Office Action dated Apr. 3, 2009 in U.S. Appl. No. 11/459,281.
Response to Office Action filed Sep. 3, 2009 in U.S. Appl. No. 11/459,281.
Office Action dated Nov. 23, 2009 in U.S. Appl. No. 11/459,281.
Office Action dated Aug. 20, 2008 in U.S. Appl. No. 11/459,284.
Response to Office Action filed Nov. 14, 2008 in U.S. Appl. No. 11/459,284.
Office Action dated Feb. 23, 2009 in U.S. Appl. No. 11/459,284.
Response to Office Action filed Aug. 21, 2009 in U.S. Appl. No. 11/459,284.
Office Action dated Sep. 28, 2009 in U.S. Appl. No. 11/459,284.
Response to Office Action filed Dec. 14, 2009 in U.S. Appl. No. 11/459,284.
Office Action dated Mar. 16, 2010 in U.S. Appl. No. 11/459,284.
Office Action dated Sep. 4, 2008 in U.S. Appl. No. 11/459,285.
Response to Office Action filed Dec. 4, 2008 in U.S. Appl. No. 11/459,285.
Office Action dated Feb. 13, 2009 in U.S. Appl. No. 11/459,285.
Response to Office Action filed Aug. 13, 2009 in U.S. Appl. No. 11/459,285.
Office Action dated Sep. 16, 2009 in U.S. Appl. No. 11/459,285.
Response to Office Action filed Dec. 5, 2009 in U.S. Appl. No. 11/459,285.

Australian Office Action dated Feb. 19, 2010 in Australian Patent Application No. 2006272401.
Response to Office Action filed Apr. 18, 2010 in U.S. Appl. No. 11/459,237.
Response to Office Action filed Apr. 22, 2010 in U.S. Appl. No. 11/459,278.
Response to Office Action filed Apr. 22, 2010 in U.S. Appl. No. 11/459,281.
Response to Office Action filed Apr. 23, 2010 in U.S. Appl. No. 11/459,296.
Response to Office Action filed Apr. 26, 2010 in U.S. Appl. No. 11/459,247.
Response to Chinese Office Action filed Apr. 26, 2010 in Chinese Patent Application No. 200810095971.3.
English Translation of Amended Claims filed Apr. 26, 2010 in Response to Chinese Office Action in Chinese Patent Application No. 200810095971.3.
Office Action dated May 12, 2010 in U.S. Appl. No. 11/459,247.
Office Action dated May 12, 2010 in U.S. Appl. No. 11/459,296.
Chinese Office Action dated Oct. 9, 2010 in Chinese Patent Application No. 200810095971.3.
Response to Office Action dated Jan. 18, 2011 in U.S. Appl. No. 11/459,224.
Response to Office Action dated Jan. 5, 2011 in U.S. Appl. No. 11/459,237.
Office Action dated Dec. 8, 2010 in U.S. Appl. No. 11/459,247.
Response to Office Action dated Oct. 1, 2010 in U.S. Appl. No. 11/459,259.
Office Action dated Dec. 22, 2010 in U.S. Appl. No. 11/459,259.
Response to Office Action dated Jan. 5, 2011 in U.S. Appl. No. 11/459,278.
Response to Office Action dated Oct. 6, 2010 in U.S. Appl. No. 11/459,281.
Office Action dated Nov. 24, 2010 in U.S. Appl. No. 11/459,281.
Office Action dated Dec. 2, 2010 in U.S. Appl. No. 11/459,296.
Office Action dated Aug. 16, 2010 in U.S. Appl. No. 11/459,224.
Response to Office Action dated Sep. 14, 2010 in U.S. Appl. No. 11/459,247.
Response to Office Action dated Aug. 10, 2010 in U.S. Appl. No. 11/459,284.
Response to Office Action dated Jul. 29, 2010 in U.S. Appl. No. 11/459,285.
Office Action dated Oct. 5, 2010 in U.S. Appl. No. 11/459,285.
Response to Office Action dated Sep. 14, 2010 in U.S. Appl. No. 11/459,296.
Response to Office Action dated Feb. 7, 2011 in U.S. Appl. No. 11/459,285.
Office Action dated Feb. 3, 2011 in U.S. Appl. No. 11/459,237.
Office Action dated Feb. 4, 2011 in U.S. Appl. No. 11/459,278.
Chinese Office Action dated Apr. 29, 2010 in Chinese Patent Application No. 200680034090.X.
Office Action dated Jul. 8, 2010 in U.S. Appl. No. 11/459,237.
Response to Office Action filed Jul. 6, 2010 in U.S. Appl. No. 11/459,266.
Office Action dated Jul. 9, 2010 in U.S. Appl. No. 11/459,278.
Office Action dated Jul. 7, 2010 in U.S. Appl. No. 11/459,281.
Pocket Video Scanner 2.4 Ghz Band, http://www.tetrascanner.com/pocket-video-scanner-details.html, Jul. 26, 2005, 1 page.
ICOM IC-R3 Receiver, http://javiation.co.uk/ic-r3.html, Copyright (c) Javiation 2000-2004, Jul. 26, 2005, 2 pages.
Video Signal Scanner: Wireless video scanner, Copyright 2003, http://www.spyequipmentguide.com/video-signal-scanner.html, Jul. 26, 2005, 1 page.
ICOM IC-R3—Meets MIL STD810, Communications Receiver, Copyright 2000 Icom Inc., 4 pages.
Federal Communications Commission, FCC OET Search Form, FCC ID = AFJIC-R3, https://gullfoss2.fcc.gov/cgi-bin/ws.exe/prod/oet/forms/reports/Search_Form.hts?mode=Ed..., 1 page.
Koyama, Takayoshi et al., ACM Press, International Conference on Computer Graphics and Interactive Techniques, Live 3D Video in Soccer Stadium, 2003, 2 pages.
Yan, Xin et al., ACM Press, International Multimedia Conference, 3D Reconstruction and Enrichment System for Broadcast Soccer Video, 2004, 3 pages.
Front Row Technologies, My Front Row (TM), Put the "Front Row" in the palm of you hand, http://www.myfrontrow.com/pages/439116/, Copyright 2001 by Mesa Digital LLC, 10 pages.
Slettenhaar, Henk et al., Silicon Valley Tour, Fall 2000, From Hollywood to Woodside, http://siliconvalley.ch, 38 pages.
Cadence Embedded Systems Design Services Brings the Scanz Scannor to Market, http://www.edacafe.com/technical/papers/Cadence/vol4No4/scanz.php, 1999 Cadence Design Systems Inc.
Macko, Steve, Security at the Summer Olympic Games is Ready, (c) Emergencynet News Service, 1996, Tuesday, Jul. 9, 1996, vol. 2-191.
Node, world leader in Location Based Media, nodeexplorer, http://www.nodeexplore.com/, Copyright Node 2005.

* cited by examiner

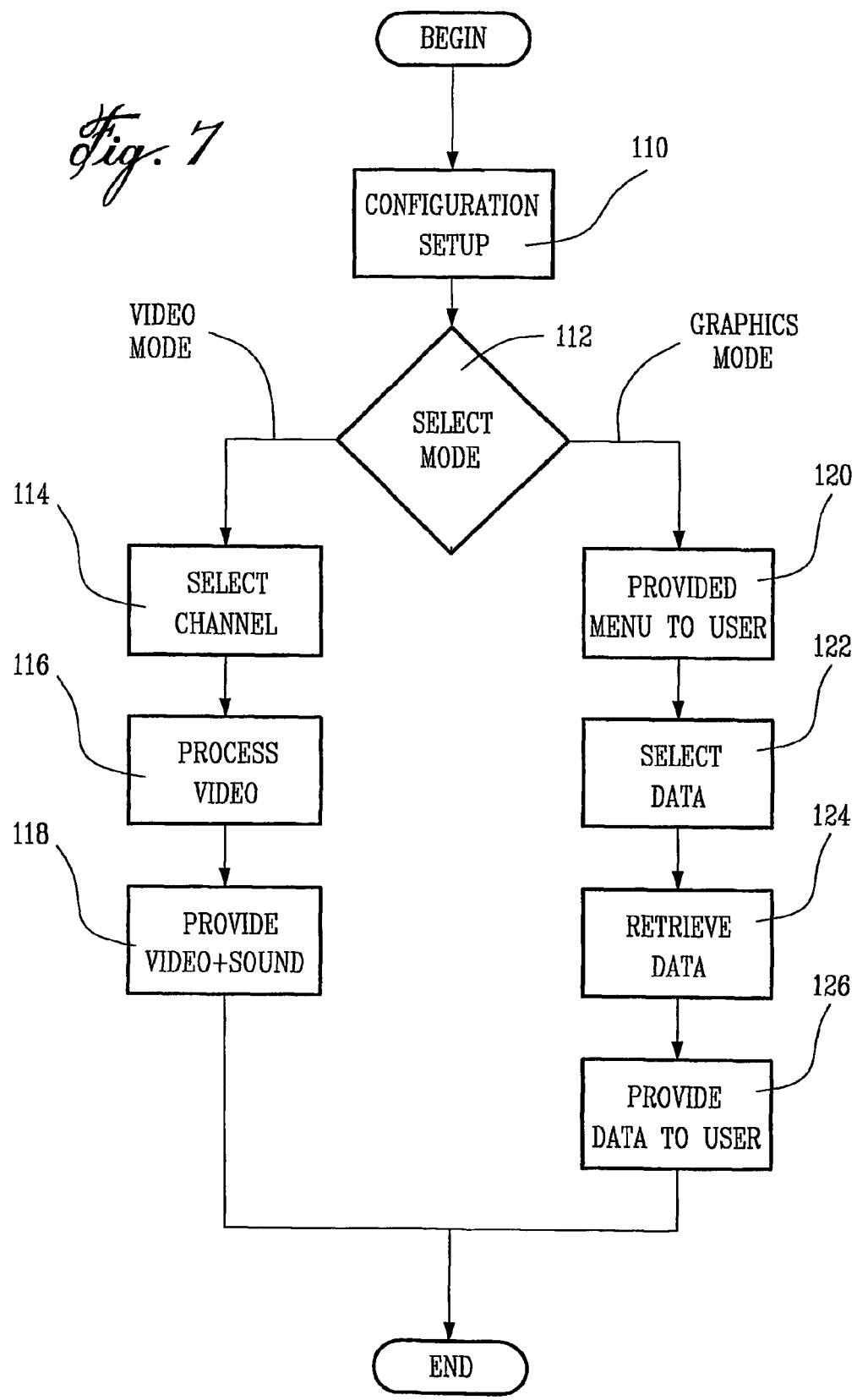

MULTI-VIDEO RECEIVING METHOD AND APPARATUS

FIELD OF THE INVENTION

This invention relates to multi-video program receiving method and apparatus, and more precisely, to the displaying and access to more than one video program related to a live event.

BACKGROUND OF THE INVENTION

Assisting to a live event is usually an enjoyable experience as all our senses are overwhelmed by various sensations. The assisting is therefore more enjoyable than a remote assisting via a television program related to said event. Unfortunately, it is usually difficult to have more than one view of the event when assisting to said event. This is particularly true during Formula 1 Grand Prix competitions, where a viewer is usually seated at a particular point of the circuit. Usually in that case, the viewer cannot have access to other parts of the circuit unless a large screen is available for instance. This may avoid the viewer to enjoy an action that is taking place at another location of the circuit unavailable to him.

Various solutions have been implemented in order to enable the viewer at the live event to access more information about the event.

For instance, in some major car racing events, such as CART/NASCAR, radio scanners are available. Such radio scanners enable the live event viewer to scan and listen to conversations between a pilot and his crew. Unfortunately the device lacks excitement and entertainment because it only offers sound, making it difficult for the user to easily understand who they are listening to and being potentially more disruptive than enhancing.

Mini portable television sets have been developed and are already available on the market. Via such mini portable television sets, the live event user can watch the race to the extent that it is broadcast, but, in most cases, the live events are broadcast on cable TV and are therefore inaccessible to these devices. These mini portable television sets have therefore limited applications and do not offer the excitement or any added value of the event that would motivate the users to widely use it.

Wireless handled devices based on web technology have also been developed. These devices run on PDA and are linked to the web. Such devices provide VIP guests and general audience live timing and scoring, radio feeds and background info on team cars, car drivers, golf players, etc. They integrate rich multimedia and interactive interfaces. Unfortunately, these devices lack with many drawbacks. A first drawback is the fact that the technology is usually implemented using a point-to-point connection, such point-to-point connection does not allow a massive use of the device at a live event as an important frequency bandwidth would be necessary to serve an important number of users. Such devices have a limited effectiveness when delivery video content due to the limited bandwidth used. Moreover, data compression schemes are mandatory in order to cope with limited bandwidth. It is difficult, in these conditions, to have a real time transmission of video data streams. These devices are also very expensive due to the fact that they are based on an expensive hardware architecture.

There is a need for a method and apparatus to overcome the above-mentioned drawbacks.

SUMMARY OF THE INVENTION

It is an object of the invention to provide a method for broadcasting more than one video program and data to a plurality of reception units;

It is another object of the invention to provide an apparatus for broadcasting more than one video program and data to a plurality of reception units using a point-to-multipoint connection;

It is another object of the invention to provide a method for receiving more than one video program and data transmitted using a wireless point-to-multipoint connection;

It is another object of the invention to provide an apparatus for receiving more than one video program and data transmitted using a wireless point-to-multipoint connection;

According to the above objects, from a broad aspect, the present invention provides a method for providing a plurality of video programs to a plurality of video program receivers having a first resolution using a single frequency band enabling transmission of a video program having a second resolution substantially higher than the first resolution, the method comprising the steps of receiving a plurality of video programs from a plurality of video program sources, the plurality of video programs having a resolution substantially equal to the second resolution; formatting each of the plurality of video programs received from the plurality of video program sources to have a resolution substantially equal to the first resolution; inserting each of the formatted video programs at a specific location in a main video signal having a resolution substantially equal to the second resolution and transmitting the main video signal to each of the plurality of video program receivers.

According to another broad aspect of the invention, there is provided an apparatus for broadcasting at least one of a plurality of video program signals inserted in a main video signal to a plurality of receiving units, each receiving unit having a first resolution, the main signal having a second resolution substantially higher than the first resolution, the apparatus comprising a formatting unit receiving the at least one of a plurality of video programs signals, the formatting unit formatting the at least one of a plurality of video program signals to have a resolution substantially equal to a resolution of a receiving unit, the resolution of the receiving unit being substantially lower than the resolution of the main video signal, a combining unit, receiving the formatted at least one of a plurality of video signals and incorporating each of the formatted at least one of a plurality of video signals into a specific location in the main video signal and a transmitter, receiving the main video signal and transmitting the main video signal to the plurality of receiving units.

According to another broad aspect of the invention, there is provided an apparatus for displaying at least one of a plurality of video program signals inserted in a main video signal, the at least one of a plurality of video program signals having a first resolution, the main signal having a second resolution substantially higher than the first resolution, the apparatus comprising a receiving unit receiving the main video signal, a user interface for enabling a user to select at least one of the plurality of video programs contained in said main video signal for a display, the user interface providing a command signal representative of the selected at least one of the plurality of video programs to display, a display screen, receiving the selected video signal for display and a processing unit receiving the main video signal and selecting at least one part of the main video signal provided by the receiving unit according to said command signal provided by the user interface, the selected one of the plurality of video programs to display being displayed on said display screen.

BRIEF DESCRIPTION OF THE DRAWINGS

These and other features, aspects and advantages of the present invention will become more clearly understood with the following description and accompanying drawings, wherein:

FIG. 7 is a flow chart that shows how the reception unit operates in the preferred embodiment of the invention;

DETAILED DESCRIPTION OF DIFFERENT EMBODIMENTS

Figure 1:
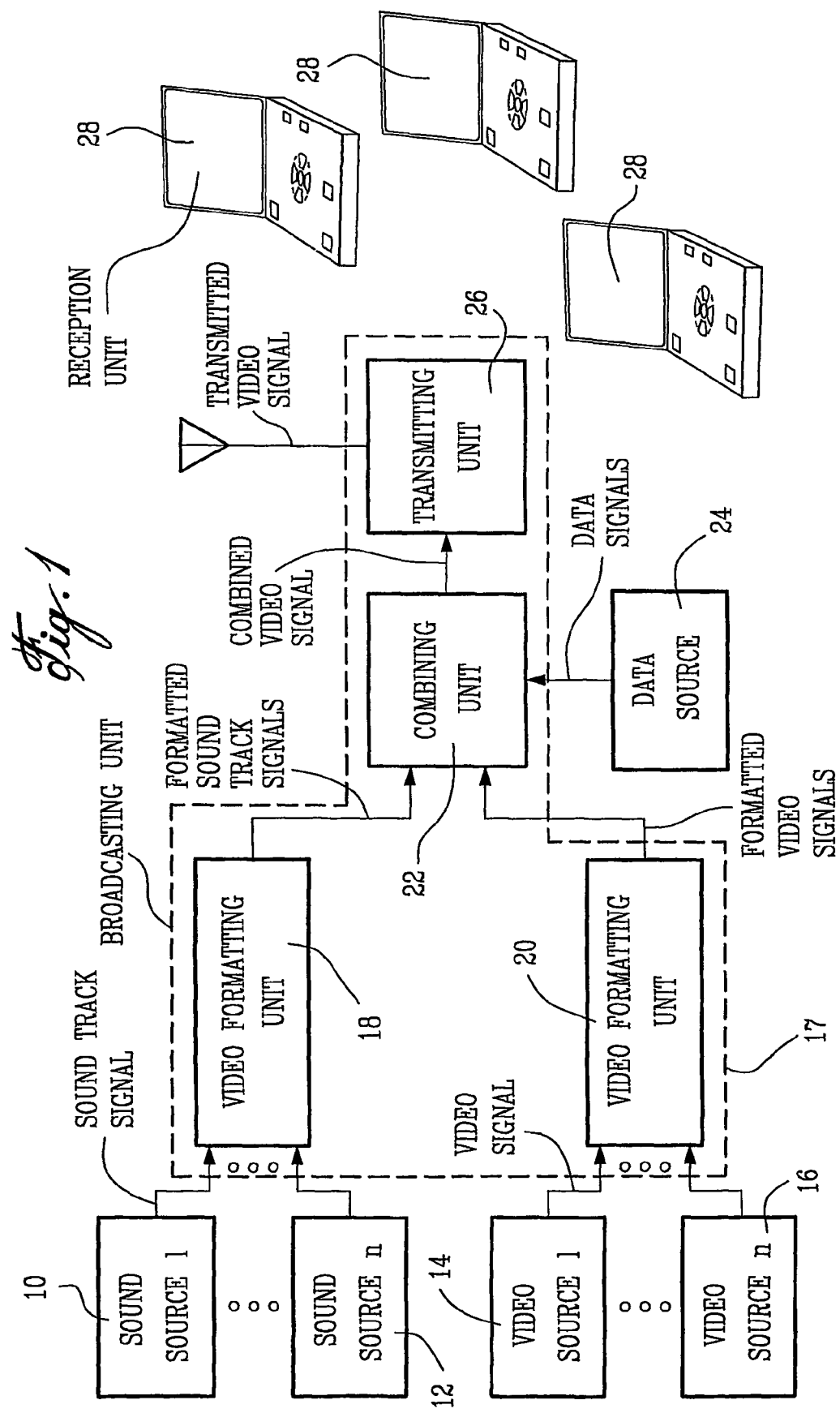
FIG. 1 is a diagram that shows a transmitting unit and a plurality of reception units.

Now referring to FIG. 1, there is shown the preferred embodiment of the invention. The system comprises a broadcasting unit 17, a plurality of sound sources, a plurality of video sources, a data source 24, and a plurality of reception unit 28.

The broadcasting unit 17 comprises a sound formatting unit 18, a video formatting unit 20, a combining unit 22, a transmitting unit 26.

The sound formatting unit 18 receives a plurality of sound track signals from the plurality of sound sources. The sound formatting unit 18 provides a plurality of formatted soundtrack signals. In the preferred embodiment of the invention, the formatted soundtrack signals have a specific bandwidth as explained below.

The video formatting unit 20 receives a plurality of video signals from a plurality of video sources. The video formatting unit 20 provides a plurality of formatted video signals. In the preferred embodiment of the invention, the formatted video signals have a pixel resolution of 360 by 240.

The combining unit 22 receives the plurality of formatted soundtrack signals, the plurality of formatted video signals, and a data signal provided by the data source 24. The combining unit 22 combines the plurality of formatted soundtrack signals, the plurality of formatted video signals, and the data signals into a single video signal. In the preferred embodiment of the invention, the combined video signal is a NTSC compatible video signal. Still in the preferred embodiment of the invention, four sound sources 10 are used, and four video sources are used in order to combine the video signals. In another embodiment of the invention, more than one video sources and more than one sound sources may be used. The transmitting unit 26 receives the combined video signal and transmits the combined video signal in the preferred embodiment of the invention. The transmitting unit 26 operates under the North American NTSC broadcast standard, which includes the luminance carrier, the chrominance carrier, and the audio carrier. The total bandwidth of the transmitted signal does not exceed 6 MHz. Still in the preferred embodiment of the invention, the transmitting unit 26 is capable of covering a range of 3 km, which is necessary to suit the needs of the application. In the case of an event requiring more a larger coverage, a more powerful transmitting unit 26 may be used.

A plurality of reception units 28 receive a transmitted signal transmitted using the transmitting unit 26. As explained below, each of the reception units 28 are able to receive at least one of the plurality of video sources and at least one of the corresponding sound sources.

Figure 2:
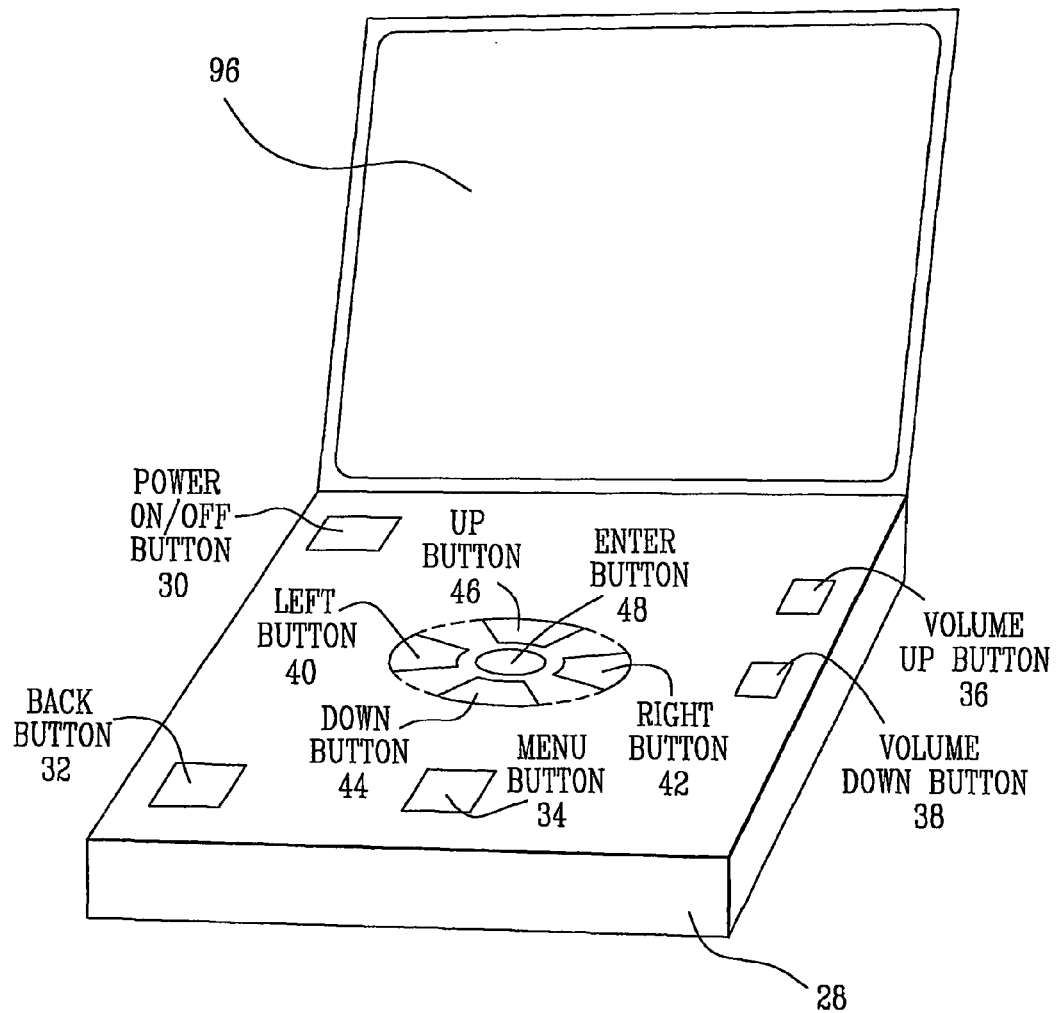
FIG. 2 is a diagram that shows a perspective view of a reception unit; the reception unit comprises a plurality of buttons for enabling a user to control it.

Now referring to FIG. 2, there is shown a reception unit 28. The reception unit 28 comprises a display screen, which is a LCD display screen 96. Still in the preferred embodiment of the invention, the display screen 96 is visible in the light and at night using front light TFT active matrix technology. The display measures 3.8 inches in diagonal. The display screen 96 has a pixel resolution of 320 by 240. The aspect ratio of the display screen is the North American TV standard 4:3. It will be appreciated by someone skilled in the art that other television standards may be used.

The reception unit 28 comprises a user interface having a plurality of buttons. In the preferred embodiment of the invention, the user interface comprises a power on/off button 30, a back button 32, a graphics menu 34, a volume up button 36, a volume down button 38, a left button 40, a right button 42, an up button 46, a down button 44 and a enter button 48.

The power on button 30 enables the user to switch on, switch off the reception unit 28. The volume up button 36 enables the user to increase the output volume of the reception unit 28. The volume down button 38 enables the user to decrease the output volume of the reception unit 28. The menu button 34 enables the user to access graphics. The back button 32 enables the user to access a screen display prior a last command. The left button 40, the right button 42, the down button 38, and the up button 46 enable the user to navigate in a plurality of menus displayed on the display screen 96. The enter button 48 enables the user to confirm a selection in a menu displayed on the display screen of the reception unit 28.

Figure 3:
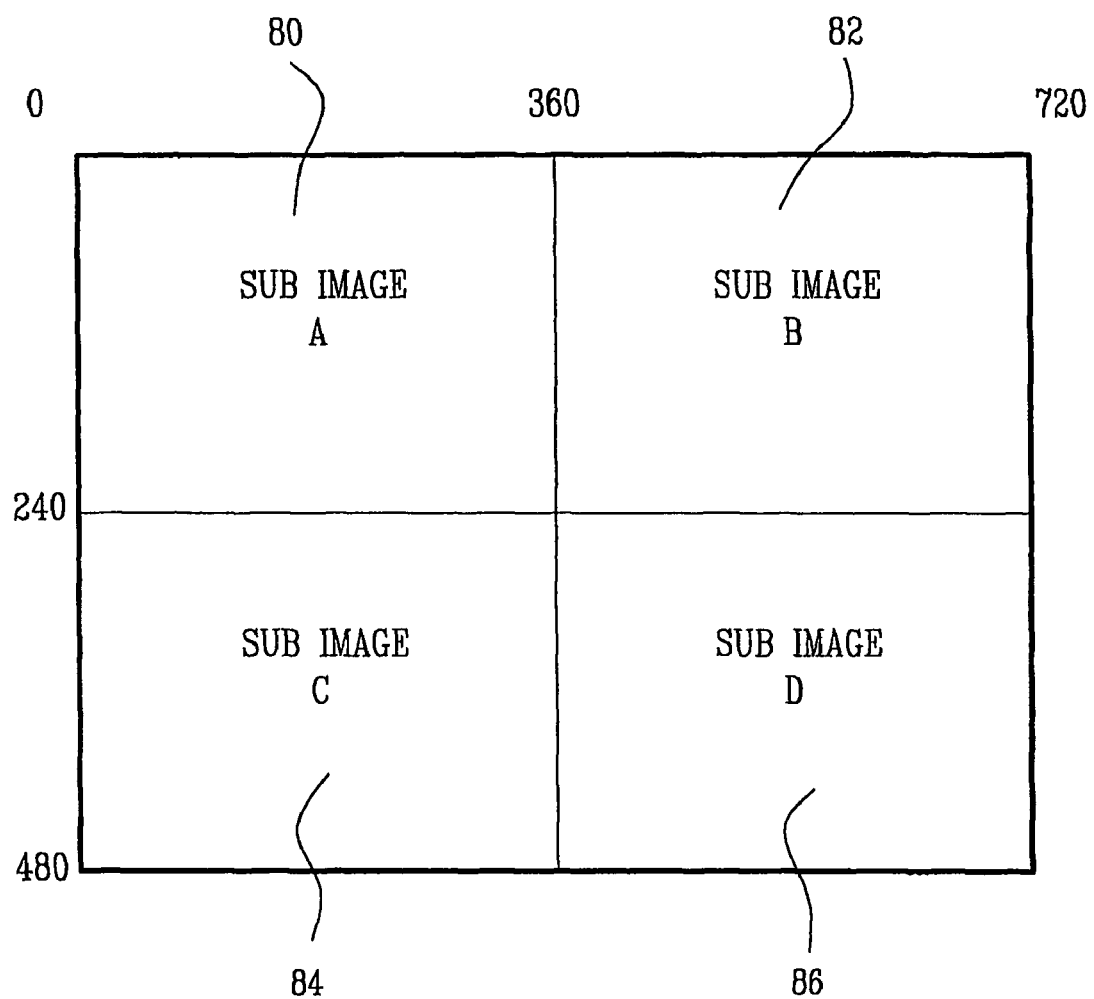
FIG. 3 is a diagram that shows one image of a main video signal; the image comprises four different images originating from different video signals.

Now referring to FIG. 3, there is shown a diagram which presents a single image of the combined video signal generated by the combining unit 22. The single image shown in this figure comprises four sub-images, respectively sub-image 80, sub-image 82, sub-image 84 and sub-image 86. Sub-image 80 refers to an image originating from the first video source. Sub-image 82 refers to an image originating from the second video source. Sub-image 84 refers to an image originating from the third video source. Sub-image 86 refers to an image originating from the fourth video source.

In the preferred embodiment of the invention, the pixel resolution of the sub-image 80, the sub-image 82, the sub-image 84 and the sub-image 86 is 320 by 240.

Figure 4:
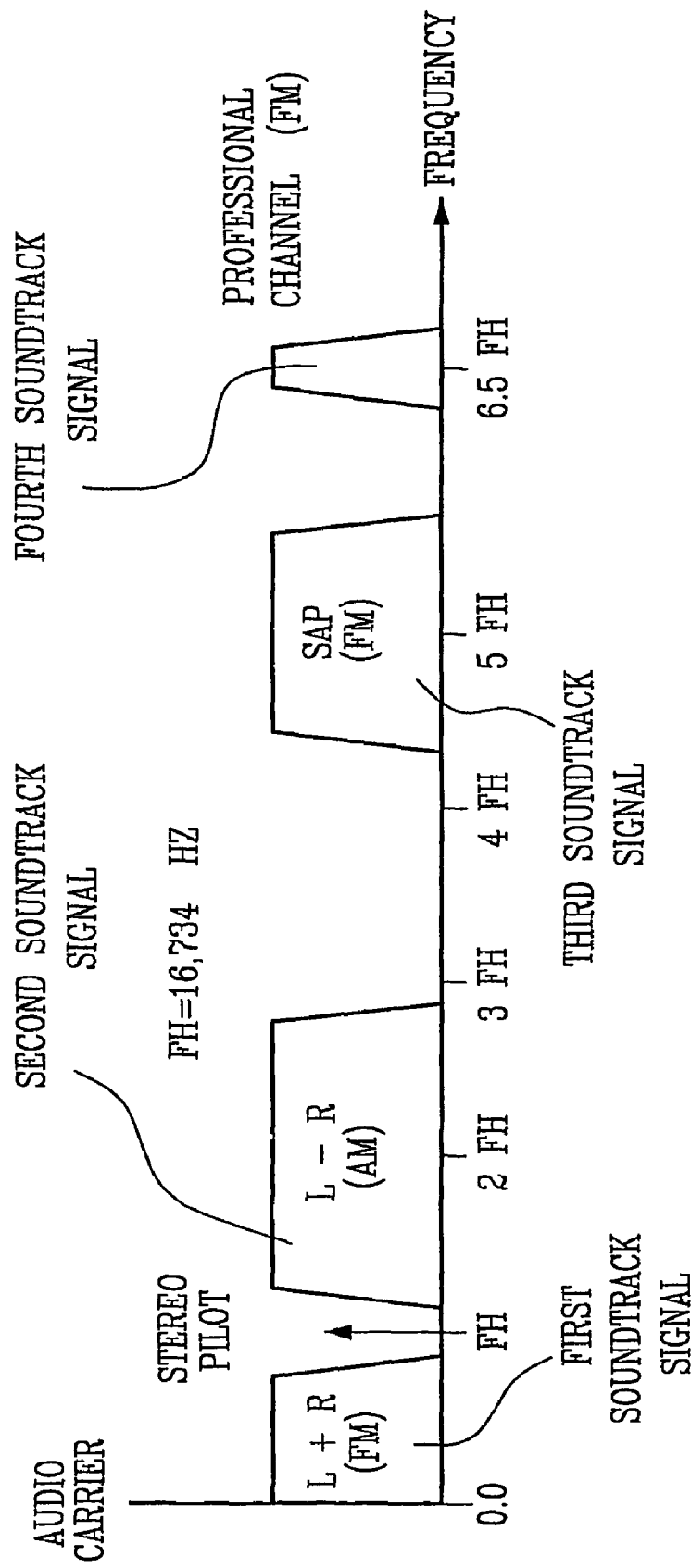
FIG. 4 is diagram which shows how four sound track signals are embodied in a single main video signal.

Now referring to FIG. 4, there is shown how audio is formatted in the preferred embodiment of the invention.

In the preferred embodiment of the invention, the first sound track signal is stored in the main audio channel portion of the combined video signal, which is referred as the L+R portion of the combined video signal. Still in the preferred embodiment of the invention, the second sound track signal is stored in the L−R portion of the combined video signal; the third sound track signal is stored in the SAP portion of the combined video signal and the fourth sound track signal is stored in the cue channel portion of the combined video signal. It will be appreciated by someone skilled in the art that alternatives storing schemes may be used depending on the transmission standard used. Furthermore, it will be appreciated that the first sound track signal, the second sound track signal, the third sound track signal and the fourth sound track signal may be compressed using a CODEC prior being inserted in the combined video signal. Someone skilled in the art will appreciate that compression may provide a higher sound quality.

Figure 5:
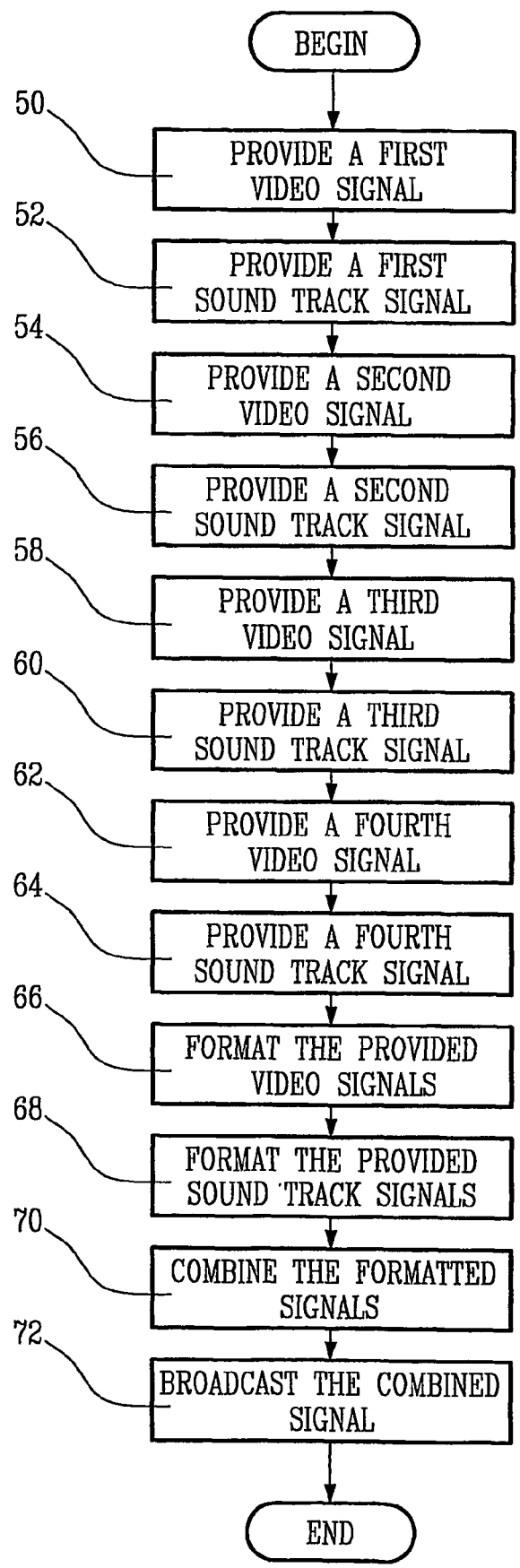
FIG. 5 is a flow chart that shows how various video program signals are transmitted to a plurality of reception unit.

Now referring to FIG. 5, there is shown a flow chart which shows the operating of the broadcasting unit 17. According to step 50, a first video signal is provided by a video source. According to step 52, a first soundtrack signal is provided by a first sound source. According to step 54, a second video signal is provided by a second video source. According to step 56, a second soundtrack signal is provided by a second sound source. According to step 58, a third video signal is provided by a third video source. According to step 60, a third soundtrack signal is provided by a third sound source. According to step 62, a fourth video signal is provided by a fourth video source. According to step 64, a fourth soundtrack signal is provided by a fourth sound source. According to step 66, the first video signal provided in step 50, the second video signal provided in step 54, the third video signal provided in step 58 and the fourth video signal provided in step 62 are formatted in a suitable format by the video formatting unit 20 as explained below. According to step 68, the first soundtrack signal provided in step 52, the second soundtrack signal provided in step 56, the third soundtrack signal provided in step 60, and the fourth soundtrack signal provided in step 64 are formatted by the sound formatting unit 18 into a suitable format as explained below. According to step 70 the combining is performed using the plurality of formatted soundtrack signal generated according to step 68 and the plurality of formatted radio signals generated according to step 66 and using a data signal providing according to step 48. According to step 72, the combined signal generated to step 70 is transmitted using the transmitting unit 26.

In an alternative embodiment of the invention, at least one graphics source may be used instead of at least one video source.

Figure 6:
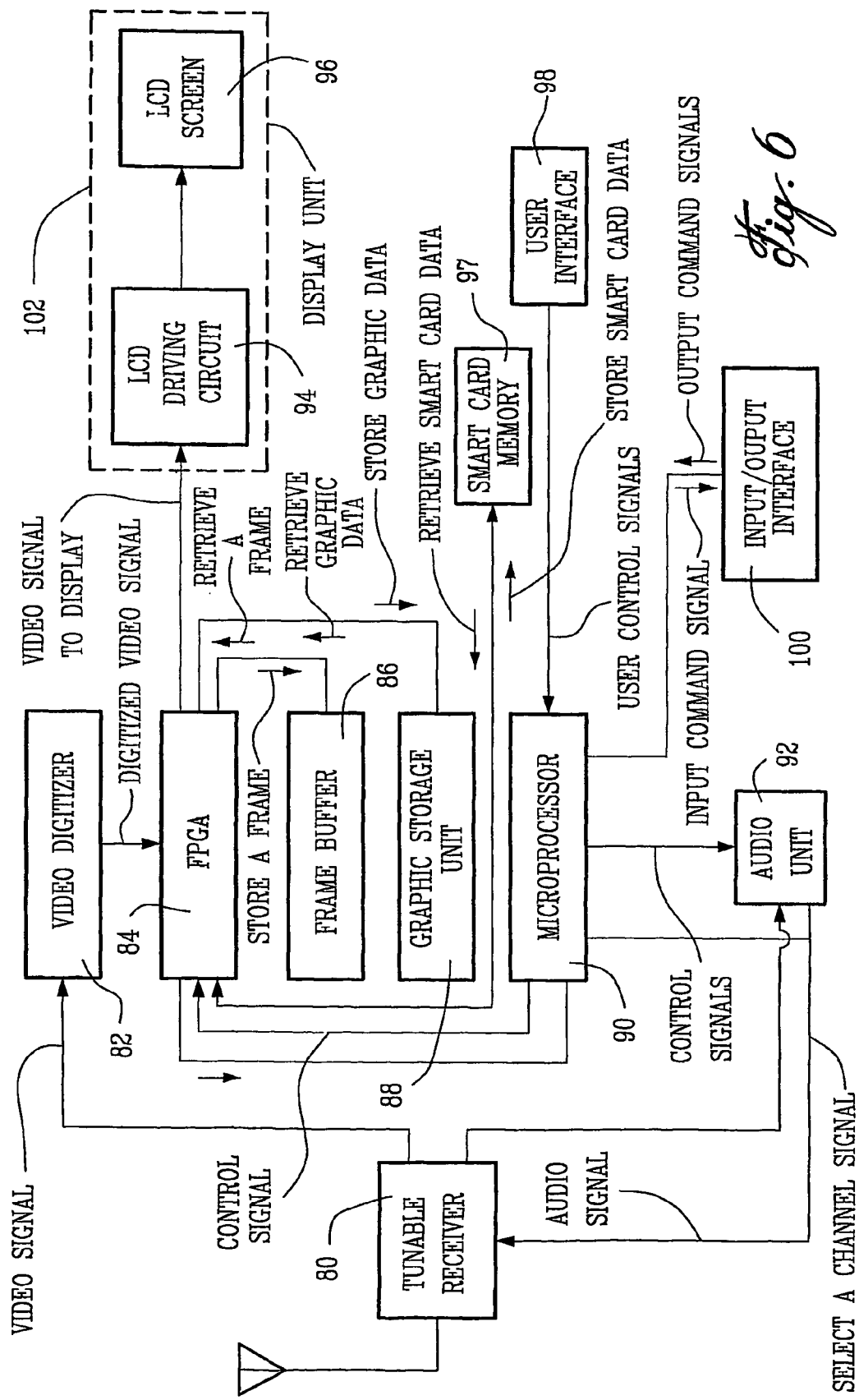
FIG. 6 shows a block diagram of the preferred embodiments of a reception unit, the reception unit comprises a tunable receiver, a video digitizer, a Field Programmable Gate Array (FPGA), a frame buffer, a graphics storage unit, a microprocessor, a user interface, an audio unit, a display unit and an input/output interface.

Now referring to FIG. 6, there is shown a block diagram of the reception unit 28 in the preferred embodiment of the invention. In the preferred embodiment of the invention, the reception unit 28 comprises a tunable receiver 80, a video digitizer 82, a Field Programmable Gate Array (FPGA) 84, a frame buffer 86, a graphics storage unit 88, a microprocessor 90, an audio unit 92, a display unit 102, a user interface 98, and an input/output interface 100. The display unit 102 comprises a LCD driving circuit 94 and a LCD screen 96.

In the preferred embodiment of the invention, the LCD screen 96 is a Sanyo TM038QV-67A02A; the FPGA 84 is a Xilinx Spartan II. Still in the preferred embodiment of the invention, the microprocessor 90 is a Microchip PIC16F877. The tunable receiver 80 is a Samsung TCPN9081DA10C. The video digitizer 82 is a Philipps SAA7111. The frame buffer 86 is a ISSI IS62LV12816L. The graphics storage unit 88 is an AMD 29LV640D.

The combined video signal transmitted using the transmitting unit 26 is received by an antenna of the tunable receiver 80. The microprocessor 90 sends a selected channel signal to the tunable receiver 80. The tunable receiver 80 extracts a video signal according to the selected channel signal. The video digitizer 82 digitizes the video signal received from the tunable receiver 80. The FPGA 84 receives the digitized video signal provided by the video digitizer 82 and stores at least one frame of the digitized video signal into the frame buffer 86; the digitized video signal is stored into the frame buffer 86 at a rate of 30 frames per second in the preferred embodiment of the invention. The FPGA 84 further extracts the embedded data comprised in the Vertical Blanking Interval (VBI) portion of the digitized video signal and stores the data in the FPGA 84.

The microprocessor 90 controls the audio unit 92. In the preferred embodiment of the invention, the audio unit 92 comprises an audio amplifier receiving an audio signal received from the tunable receiver 80 according to a selected portion of the video signal transmitted in accordance with the storing scheme presented in FIG. 4. The user may provide information using the user interface 98 to the microprocessor 90. An input/output interface 100 is connected to said microprocessor 90 in order to upload/download information from a remote device. Information downloaded from a remote device may comprise graphics data which, after being collected by said microprocessor 90 via said input/output interface 100, are provided to the graphics storage unit 88 via the FPGA 84. The FPGA 84 provides a video signal to display to the LCD driving circuit 94 of the display unit 102. The LCD driving circuit 94 provides a final signal to the LCD screen 96.

Now referring to FIG. 7, there is shown the operation of the reception unit 28. According to step 110, a configuration set up is performed. The configuration set up 110 comprises the providing of a selected channel signal to the tunable receiver 80. In the preferred embodiment of the invention, the reception unit 28 receives simultaneously a single channel signal, in an alternative embodiment, the reception unit 28 may receive, simultaneously, a plurality of channel signals using a plurality of tunable receivers 80. Still according to the configuration set up, the display unit 102 is carefully tuned by the microprocessor 90 via the FPGA 84. According to step 112, the user performs a mode selection. If the user selects the video mode, a first channel is selected according to step 114. According to step 116, video is processed by the FPGA 84. More precisely, the FPGA 84 retrieves a frame from the frame buffer 86. The FPGA 84 descrambles the retrieved frame and provides the video signal to display to the LCD driving circuit 94. The tunable receiver 80 extracts a corresponding audio signal to the video signal selected from the corresponding portion of the transmitted video signal. The audio unit 92 provides an amplified audio signal, which may be listened by the user using headsets for instance. The amplified audio signal and the displayed video signal are provided to the user according to step 118.

If the user selects the graphics mode using the menu button 34, according to step 120, a menu is provided to the user. The menu is created using data extracted from the digitized video signal in the Vertical Blanking Interface (VBI) portion of the signal and stored in the FPGA 84 and/or using graphics data stored in the graphics storage unit 88. In the preferred embodiment, graphics are stored using BMP file format.

The microprocessor 90 controls the FPGA 84 to generate a video signal to be displayed which is then provided to the LCD driving circuit 94, the video signal to be displayed comprises the above-mentioned data provided by the FPGA 84 together combined with graphics data stored in the graphics storage unit. According to step 122, the user selects via the user interface 98 a new data to obtain. In one application of the invention, the data may be the ranking of a participant of the live event, a summary of a part of the event. According to step 124, the microprocessor 90 controls the FPGA 84 to retrieve data, which is stored in the FPGA 84. According to step 126, the data are provided to the user as explained previously. In the preferred embodiment of the invention, the video signal to be displayed comprises the data as well as graphics data retrieved from the graphics storage unit 88 by the FPGA 84. The video signal to be displayed is therefore created by the FPGA 84.

Now referring back to FIG. 1, the sound formatting unit 18 converts the first soundtrack signal, the second soundtrack signal, the third soundtrack signal and the fourth soundtrack signal into formatted soundtrack signals that will be combined and modulated to create a combined video signal having the first soundtrack signal, the second soundtrack signal, the third soundtrack signal and the fourth soundtrack signal modulated according to the scheme displayed in FIG. 4. Still referring to FIG. 1, the video formatting unit 20 comprises four digitizers receiving respectively the first video signal, the second video signal, the third video signal and the fourth video signal and providing a first digitized video signal, a second digitized video signal, a third digitized video signal and a fourth digitized video signal. The video formatting unit 20 further comprises four interpolating units respectively connected to the first digitizer, the second digitizer, the third digitizer and the fourth digitizer. The first interpolating unit receives the first digitized video signal, the second interpolating unit receives the second digitized video signal, the third interpolating unit receives the third digitized video signal and the fourth interpolating unit receives the fourth digitized video signal. Each interpolating unit dismisses one pixel about two horizontally and one pixel about two vertically. The first interpolating unit provides therefore an interpolated image that has a pixel resolution of one about four of the original pixel resolution, the resolution of the first digitized image provided to the first interpolating unit. The second interpolating unit, the third interpolating and the fourth interpolating unit operate in the same manner as the first interpolating unit. The combining unit 22 receives the formatted video signals and the formatted soundtrack signals and provides a combined video signal.

In order to protect the network against eavesdropping and uncontrolled use, the combining unit 22 further comprises a scrambling unit which scrambles the combined video signal prior providing it to the transmitting unit 26; this scrambling unit is not shown in FIG. 1.

In the preferred embodiment of the invention, switching vertical lines two by two performs the scrambling. The FPGA comprised in the reception unit is used to descramble the transmitted video signal. Someone skilled in the art will appreciate that other scrambling schemes may be used. A code related to said scrambling is stored in a code storing unit connected to said FPGA.

Alternatively, a single sound track is provided by a single sound source to the sound formatting unit 18, and a single video signal is provided by a single video signal to the video formatting unit 20. In such embodiment, the transmitted video signal comprises the single sound track signal and the single video signal. However, in such embodiment, an encoding is performed prior the transmitting in order to avoid unauthorized reception of the transmitted signal. The signal may be transmitted using in analog or digital techniques. It will be appreciated that such alternative embodiment is particularly well-suited for an event requiring a short geographic scale coverage.

I claim:

1. A method for providing a plurality of video programs to a plurality of portable video program receivers at a venue hosting a live event, comprising:

receiving a plurality of video streams derived from video cameras capturing images of the live event;

reducing image resolution of the plurality of video streams to produce multiple resolution reduced video streams;

accessing data content that includes menu data and computer generated graphics related to the live event, the menu data for use by the portable program receivers to create and display a menu, the menu includes a list of options to make selections, one or more of the options is to access and display the computer generated graphics related to the live event, the computer generated graphics are not video data captured from a video camera, the data content is independent of the video streams;

combining the multiple resolution reduced video streams and data content into a combined signal that includes the multiple resolution reduced video streams, the menu data and the computer generated graphics combined such that the plurality of portable video program receivers can extract one of the video streams and the plurality of portable video program receivers can extract the data content; and generating a wireless RF signal to wirelessly convey the combined signal to the plurality of portable video program receivers.

2. A method as defined in claim 1, including receiving a plurality of sound tracks associated with respective video streams and wirelessly conveying audio information derived from the sound tracks to the plurality of portable video program receivers.

3. A method as defined in claim 2, including receiving a data signal from a data source, the data content is derived from the data signal.

4. A method as defined in claim 3, wherein the live event is a sporting event, the data content conveying information about ranking of a participant in the live event.

5. A method as defined in claim 4, wherein the live event is a motor sports event.

6. A method as defined in claim 1, wherein each video stream has an image resolution of 720 pixels by 480 pixels before said reducing.

7. A method as defined in claim 6, wherein each resolution reduced video stream has a resolution of 360 pixels by 240 pixels.

8. A method as defined in claim 3, wherein the wireless RF signal is digital.

9. A method as defined in claim 8, wherein the wireless RF signal is contained within a single frequency band.

10. A method as defined in claim 9, wherein the single frequency band has a bandwidth of about 6 MHz.

11. An apparatus for broadcasting multiple video programs to a plurality of portable video program receivers at a venue hosting a live event, said apparatus comprising:

a first input interface that receives a plurality of video streams derived from video cameras capturing images of the live event;

a second input interface that receives a data signal from a data source, the data signal includes menu data and computer generated graphics related to the live event, the menu data for use by the portable program receivers to create and display a menu, the menu includes a list of options to make selections, the computer generated graphics are not video data captured from a video camera, the data content is independent of the video streams; and a transmitter that generates and transmits a wireless RF signal to the plurality of portable video program receivers, the wireless RF signal includes the plurality of video streams, the menu data and the computer generated graphics in a common wireless RF signal such that the plurality of portable video program receivers can extract one of the video streams to display and the plurality of portable video program receivers can extract the menu data to create a menu based on the menu data.

12. An apparatus as defined in claim 11, wherein the wireless RF signal is digital.

13. An apparatus as defined in claim 12, wherein the wireless RF signal is contained within a single frequency band.

14. An apparatus as defined in claim 13, wherein the single frequency band has a bandwidth of about 6 MHz.

15. A method as recited in claim 1, further comprising:
receiving the wireless RF signal at a portable video program receiver of the plurality of portable video program receivers;
automatically identifying the data content in the RF signal; and
storing the data content in a buffer to be used when in a graphics mode of the portable video program receiver.

16. A method for providing a plurality of video programs to a plurality of portable video program receivers at a venue hosting a live event, comprising:
receiving a plurality of video streams derived from video cameras capturing images of the live event;
reducing image resolution of the plurality of video streams to produce multiple resolution reduced video streams;
accessing data content that includes menu data, the menu data for use by the portable video program receivers to create a menu, the menu includes a list of options that can be selected on the portable video program receivers;
combining the multiple resolution reduced video streams and data content into a combined signal that includes the multiple resolution reduced video streams and the menu data combined such that the plurality of portable video program receivers can extract one of the multiple resolution reduced video streams and the plurality of portable video program receivers can extract the menu data; and
generating a wireless RF signal to wirelessly convey the combined signal to the plurality of portable video program receivers using a point-to-multipoint transmission.

17. A method as defined in claim 16, wherein the wireless RF signal is contained within a single frequency band.

18. A method for providing a plurality of video programs of a live event, comprising:
receiving a wireless signal at a portable receiver, the wireless signal comprises a plurality of video streams from video cameras capturing images of the live event combined with data content, the data content includes menu data, the menu data provides for the portable receivers to display a menu, the menu includes a list of options for selection;
receiving a selection of one of the video streams;
extracting the selected video stream from the combined video streams and data content;
displaying the selected video stream on the portable receiver;
extracting the data content from the combined video streams and data content;
creating a menu on the portable receiver using the data content extracted from the combined video streams and data content;
receiving a selection in the menu to access data;
retrieving the data in response to the selection; and
providing the retrieved data to the user.

19. The method as defined in claim 18, wherein the wireless signal is received at a single frequency band.

20. The method as defined in claim 18, wherein:
the data content includes computer generated graphics related to the live event; and
the menu includes a list of options to make selections, one or more of the options is to access and display the computer generated graphics related to the live event, the computer generated graphics are not video data captured from a video camera, the data content is independent of the video streams.

21. A portable video program receiver for use at a event, comprising:
a receiver for wirelessly receiving a plurality of video streams from video cameras capturing images of the event and data content in a combined wireless signal, the data content includes menu data;
a display;
data storage; and
a processing system in communication with the display, the data storage and the receiver;
the processing system receives a selection of one of the video streams, extracts the selected video stream from the combined wireless signal, causes the selected video stream to be displayed, extracts the data content from the combined wireless signal, creates a menu on the display using the data content extracted from the combined wireless signal, receives a selection in the menu to access data, retrieves the data in response to the selection and provides the retrieved data to the user.

22. The portable video program receiver as defined in claim 21, wherein:
the processing system comprises a microprocessor and a FPGA.

* * * * *